United States Patent [19]

D'Eletto

[11] Patent Number: 6,078,647
[45] Date of Patent: Jun. 20, 2000

[54] METHOD AND APPARATUS FOR DETECTING A DATA SERVICE PROVIDER IN A PUBLIC SWITCHED TELEPHONE NETWORK

[75] Inventor: Robert A. D'Eletto, Highlands Ranch, Colo.

[73] Assignee: Hewlett Packard Company, Palo Alto, Calif.

[21] Appl. No.: 08/976,409

[22] Filed: Nov. 21, 1997

[51] Int. Cl.[7] .............................. H04M 1/24; H04M 15/00
[52] U.S. Cl. ........................... 379/34; 379/133; 379/134; 379/139; 379/111; 379/113
[58] Field of Search ..................... 379/112, 113, 379/133, 900, 901, 34, 111, 219, 220, 221, 201, 229, 230, 22, 23, 26, 1, 207, 134, 137, 139, 100.03, 100.05, 138

[56] References Cited

U.S. PATENT DOCUMENTS

| | | | |
|---|---|---|---|
| 4,398,299 | 8/1983 | Darling et al. | 379/100.05 |
| 4,456,788 | 6/1984 | Kline et al. | 379/137 |
| 4,760,594 | 7/1988 | Reed | 379/154 |
| 4,856,052 | 8/1989 | Hirata | 379/100.03 |
| 5,008,927 | 4/1991 | Weiss et al. | 379/98 |
| 5,057,935 | 10/1991 | Williams | 379/100.03 |
| 5,065,426 | 11/1991 | Greenstein et al. | 379/100.03 |
| 5,425,087 | 6/1995 | Gerber et al. | 379/134 |
| 5,475,732 | 12/1995 | Pester, III | 379/34 |
| 5,606,600 | 2/1997 | Elliott et al. | 379/112 |
| 5,606,601 | 2/1997 | Witzman et al. | 379/113 |
| 5,719,924 | 2/1998 | Haneda et al. | 379/100.03 |
| 5,787,253 | 7/1998 | McCreery et al. | 370/389 |
| 5,805,681 | 9/1998 | Srikant et al. | 379/133 |
| 5,819,110 | 10/1998 | Motoyama | 395/835 |
| 5,825,769 | 10/1998 | O'Reilly et al. | 379/112 |
| 5,828,729 | 10/1998 | Clermont et al. | 379/34 |
| 5,867,565 | 2/1999 | Morikawa | 379/113 |
| 5,896,445 | 4/1999 | Kay et al. | 379/113 |
| 5,940,471 | 8/1999 | Homayoun | 379/112 |
| 5,956,693 | 9/1999 | Tessler et al. | 237/197 |
| 6,011,838 | 1/2000 | Cox | 379/133 |

FOREIGN PATENT DOCUMENTS

| | | | |
|---|---|---|---|
| 0743778A2 | 11/1996 | European Pat. Off. | H04M 3/22 |
| 2323243A | 9/1998 | United Kingdom | H04M 3/36 |
| WO96/31043A1 | 10/1996 | WIPO | H04M 3/38 |

*Primary Examiner*—Curtis A. Kuntz
*Assistant Examiner*—Rexford N. Barnie

[57] ABSTRACT

A system and method for characterizing phone calls in a public switched telephone network (PSTN), in order to identify Data Service Providers (as distinct from conventional telephone users). The system includes monitoring mechanism disposed at a first location (such as a central office or STP) for monitoring call routing messages directed to the first switch. A generating mechanism, responsive to the monitoring mechanism, is configured to generate a call record, which includes a plurality of call defining elements. An updating mechanism is configured to update a plurality of call records stored at a storage location with the call defining elements of the generated call record. Finally, an analyzing mechanism is provided and configured to analyze at least one of the call defining elements of the plurality of call records to identify Data Service Providers. The method includes the steps of monitoring routing messages directed to the first location and generating a call record including a plurality of call defining elements, the call record being identified by a first call defining element. Thereafter, the method updates a plurality of call records, stored at a storage location with the call defining elements of the generated call record. Finally, the method analyzes at least one of the call defining elements of the plurality of call records to identify Data Service Providers, as distinguished from conventional (voice) customers or users.

29 Claims, 4 Drawing Sheets

METHOD AND APPARATUS FOR DETECTING A DATA SERVICE PROVIDER IN A PUBLIC SWITCHED TELEPHONE NETWORK

BACKGROUND OF THE INVENTION

1. Field of the Invention

The present invention generally relates to communication systems, and more particularly, to improved method and apparatus for actively characterizing data calls in a public switched telephone network (PSTN) in order to identify and distinguish data service providers from end users and voice calls, for purposes of improved call routing and distribution.

2. Discussion of the Related Art

As is known, the public switched telephone network (PSTN) in the United States is divided into geographic areas called Local Access and Transport Areas (LATAs). Local Exchange Carriers (LECs) may freely transport traffic within LATA boundaries, while Interexchange Carriers (IXCs) are required to manage traffic between LATAs. The LEC typically provides customers (non-pay-type telephones) with a flat rate billing area. In practice, these billing areas are groups of destination switches, from a given subscriber's own serving switch, which are considered local. Usage between these switches is billed on a flat rate, regardless of usage. Generally, only calls outside this local area are billed on a usage sensitive basis. As a result, there is virtually no incentive to lead customers to limit local calling.

As is further known, traffic within the PSTN is transported between switches using interoffice trunks. When a call is placed on a trunk circuit, that circuit is tied up and thus no longer available for use by other customers. For cost reasons, there is a such smaller number of trunk lines extending from a switch to neighboring switches, than there are customer phone lines connected to the switch. Therefore, trunk lines are a shared resource, generally allocated on a "first come first serve" demand basis.

Based upon traffic principles that are known by those in the art, switches are generally designed with a subscriber line/trunk line ratio to limit the number of blocked calls in an hour to about 1%. Certainly, however, this number will vary depending on a number of factors including the demand at a given time, the number of customers desiring to place a call, the length established calls are maintained, etc. Over the years, these voice calling patterns have been relatively constant, such that telephone company engineers could reliably design switches and networks to achieve an expected grade of service.

In recent years, however, telephone communication systems have changed. Largely due to the proliferation of the Internet, telephone networks are becoming increasingly jammed with data traffic, as opposed to voice traffic. Not only has this led to a stark increase in the number of calls that are placed, but empirical data has demonstrated that the duration of data calls lasts for a much longer period of time than voice calls. Specifically, studies conducted with Data Service Providers (e.g., Internet Service Providers) have indicated that the average call holding time for a data call can exceed 30 minutes, as opposed to approximately 3 minutes for voice calls.

Some evaluations have revealed that, in some switches, about 12% of the total terminating inter-switch calls were known Internet Service Providers, however, some 60% of the interswitch terminating traffic was to the same known ISPs. This has led to enormous problems for telephone company engineers who design switches. Unless the service provider has subscribed to a special service from the telephone company, such as ISDN or a DSL service, phone calls to and from Data Service Providers appear like any other PSTN call. Since these calls tend to tie up the phone lines for a longer period of use, they disrupt the call pattern anticipated in connection with the design of the network. As a result, a much higher than anticipated ratio of call blocking (due to busy lines) occurs.

Accordingly, it is desired to factor the calling characteristics of Data Service Providers into the design of the PSTN. This may be done by either evenly distributing Data Service Providers on switching hardware (i.e., line concentrator units), or by establishing data networks to handle data traffic. The problem lies in identifying Data Service Providers in the first place.

Simply stated, since Data Service Providers are not required to tell phone companies that they are offering data service, most don't. As a result, the phone companies generally rely on "shopping" for such Data Service Providers. To "shop", PSTN operators identify advertisements for Data Service Providers, and call them to order service to find the dial-in number. This method requires an expensive investment of operator time, and generates results that are "hit or miss" at best.

Accordingly, there is a present need to provide a reliable system or method for identifying Data Service Providers on the PSTN, so that appropriate considerations may be taken into account in the design of a LATA of the PSTN.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system for characterizing phone calls in a public switched telephone network (PSTN), in order to identify Data Service Providers. As will be appreciated from the description provided herein, the essence of the present invention is the provision of a method and apparatus for evaluating call records to identify numbers of data service providers.

In accordance with one aspect of the invention, the system includes monitoring means disposed at a first switch for monitoring call routing messages directed to the first switch. Generating means, responsive to the monitoring means, are configured to generate a call record, which includes a plurality of call defining elements. Updating means are configured to update a plurality of call records stored at a storage location with the call defining elements of the generated call record. Finally, analyzing means are provided and configured to analyze at least one of the call defining elements of the plurality of call records to identify Data Service Providers.

In accordance with another aspect of the present invention, a method is provided for characterizing phone calls in a public switched telephone network (PSTN), to identify Data Service Providers. In accordance with a preferred embodiment, the method includes the steps of monitoring routing messages directed to the first switch and generating a call record including a plurality of call defining elements, the call record being identified by a first call defining element. Thereafter, the method updates a plurality of call records, stored at a storage location with the call defining elements of the generated call record. Finally, the method analyzes at least one of the call defining elements of the plurality of call records to identify Data Service Providers, as distinguished from conventional (voice) customers/users.

In accordance with a preferred embodiment, the call defining elements includes one or more of the following elements: the calling number (i.e., the phone number of the calling party), the called number, the release cause code, the terminating switch address, the originating switch address, a count of answered calls the called number received during off-peak hours, a count of answered calls the called number received during on-peak hours, a count of busy call attempts to the called number during off-peak hours, the total minutes of use for the called number during off-peak hours, and the total minutes of use for the called number during on-peak hours. Likewise the analyzing means may be configured to generate an additional call record that includes statistical data elements including one or more of the following: a summation of a total number of calls the called party answered during off-peak hours, a summation of a total number of calls the called party answered during peak hours; a summation of a total number of call attempts directed to the called party which were rejected due to a busy status of the called party during off-peak hours; a summation of the total minutes of usage for a called party during off-peak hours; and a summation of the total minutes of usage for a called party during peak hours.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
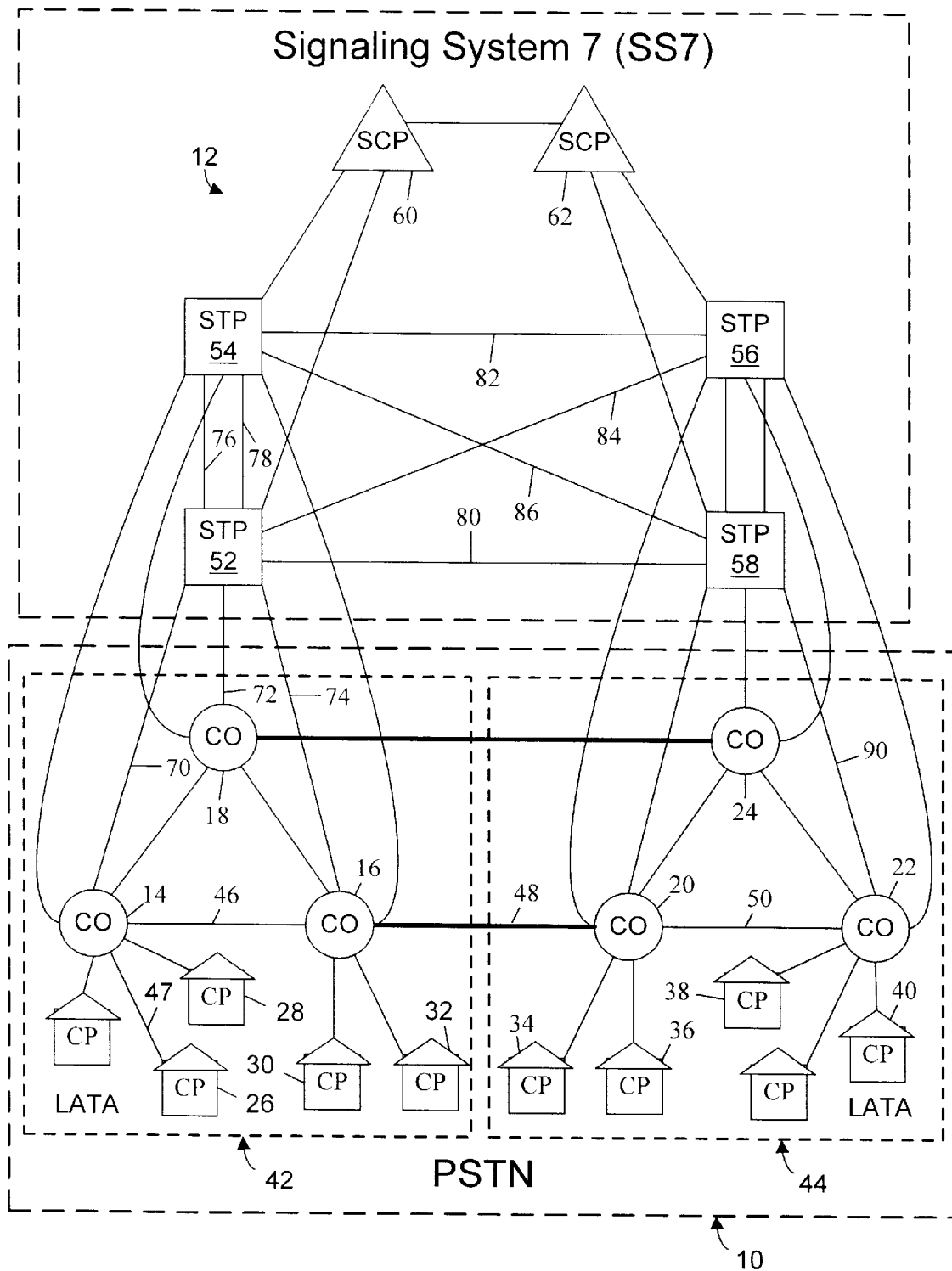
FIG. 1 is a block diagram of a portion of the PSTN with the Signaling System 7 (SS7) that is used to control switching illustrated above the PSTN 10.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, FIG. 1 shows a block diagram of a portion of the PSTN 10 with the Signal System Seven (SS7) 12 that is used to control switching illustrated above the PSTN 10. The switched telephone network 10 generally consists of interconnected switching points or central offices (COs) 14, 16, 18, 20, 22, 24. Many of the COs are further connected to customer premises (CPs) 26, 28, 30, 32, 34, 36, 38, 40. Two LATAs 42, 44 are illustrated. As previously mentioned, calls within a LATA (i.e., local calling) are generally billed on a monthly, flat-fee basis. Whereas, calls across LATA boundaries are generally billed on a usage basis; the longer the call, the higher the charge.

As is known, if a subscriber at CP 26 wishes to make a call to a person at CP 28, the call is simply routed through CO 14. If, however, the subscriber at CP 26 wishes to call a person at CP 32, the call must be routed through CO 14 and CO 16. As illustrated, such a call would pass through trunk line 46. If the trunk line 46 is available, the phone line at CP 32 is not busy, etc., then the call may be placed. In this regard, CO 16 will place a Ring signal on the line to CP 32, to alert the subscriber there that an incoming call is present. Once CO 16 detects an Off-Hook condition (i.e., the subscriber at CP 32 has picked up the handset), then the call may be connected. Such a connection ties up a trunk line 46, as well as lines 47 and 49 extending from COs 14 and 16 to CPs 26 and 32, respectively.

In similar fashion, if a subscriber at CP 26 wishes to make a call to a subscriber at CP 40, the call is routed through CO 14, CO 16, CO 20, and CO 22. Along the way, it must be passed through trunk lines 46, 48, and 50. Trunk lines 46 and 50 are local trunk lines (being contained within a single LATA), whereas trunk line 48 is an inter-exchange carrier network trunk. A trunk must be available in order to connect the desired call.

The call set signaling functions that are required in order to establish and set up a desired call are provided through an overlay data network called the Common Channel Signaling (CCS) network, which uses a protocol called Signaling System Seven (SS7) 12. In this regard SS7 includes a series of signal transfer points (STPs) 52, 54, 56, 58, which are large packet switches. Each STP in a network is connected to the COs in the associated portion of the PSTN 10 by "A-links," such as 70, 72, and 74. STPs 52 and 54 are referred to as a mated pair of STPs, which are interconnected by "C-links" (e.g., 76, 78). A mated pair of STPs (e.g., 52, 54) serves a single LATA (e.g., 42). The mated pairs of STP's are interconnected with other mated pairs of STPs across "B-links" (e.g., 80, 82) and "D-links" (e.g., 84, 86).

The STPs 52, 54, 56, 58 are connected to signal control points (SCPs) 60 and 62. Although SCPs may be provided in various forms having varying functions, the primary role of all SCPs is to contain and provide routing information for phone calls on the PSTN 10. It will be appreciated that the SS7 network 12 is an exceedingly redundant data network. To illustrate, a message from CO 14 to CO 22 may travel in any one of a number of different possible routes. For example, it may pass along A-link 70 to STP 52, then along B-link 80 to STP 58, then along A-link 90 to CO 22. Alternatively, it may pass along A-link 70 to STP 52, then along C-link 76 to STP 54, then along D-link 86 to STP 58, and finally along A-link 90 to CO 22. As a general rule, transmissions across C-links are to be minimized, as they cause messages to pass through addition switches and, when busy, tie up the STP mated pair.

Having described the physical components of the PSTN 10 and the SS7 network 12, a brief description will now be given to illustrate the operation of placing a call from CP 26, for example, to CP 40. The process begins by a user at CP 26 lifting the handset of a telephone. Signaling that is known in the art then occurs, whereby the CO 14 recognizes that the handset at CP 26 is Off-Hook, and the CO 14 then provides a dial tone to the twisted pair line extending to CP 26. The user then dials the phone number that corresponds to CP 40. In response, the CO 14 generates an initial address message that has the destination address of CO 16, the origination address of CO 14, as well as other miscellaneous information needed for call setup. Specifically, the initial address message includes the following information: calling number, called number, address of originating switch, address of terminating switch, and trunk identifier.

This initial address message would then be sent from CO 14 to either STP 52 or STP 54. The receiving STP would then evaluate the message and determine that it is destined for CO 16, and forward the message accordingly. This same messaging process between CO 14 and CO 16 will be repeated to between CO 16 and CO 20, then CO 20 and CO 22. Recognizing that the call is directed across LATA boundaries, when messaging between CO 16 and CO 20, the receiving STP would then investigate the possible routes (B-links and D-links) to either STP 56 or STP 58. This subsequent STP then forwards the message along the appropriate A-link to CO 20.

Once CO 22 receives the initial address message, which includes the phone number for CP 40, CO 22 determines whether the phone line extending to CP 40 is busy (i.e., is a handset at CP 40 Off-Hook?), whether a circuit is available, whether there is temporary system or network failure, etc. If CO 22 determines that the call cannot be completed, then it sends a release (REL) message to CO 14. If not, then CO 22 generates an address complete message to indicate that it received the request and that the line for CP 40 is not busy. That message is then sent back to CO 14 simply by reversing the point codes of the initial message (i.e., the origination point code and destination point code). CO 22 also places a Ring signal on the line extending to CP 40 and awaits an answer. This Ring signal is also relayed back to CO 14 and ultimately CP 26, so that the person dialing from CP 26 is provided feedback indicating the status of the call. Once a person at CP 40 lifts a handset to answer the call, CO 22 detects this by recognizing a change in the impedance on the local loop, and sends an answer message (ANM) via SS7 network 12 back to CO 14 indicating that phone was answered, and the interconnecting trunks 46, 48, and 50 are connected to establish a connection for the call. Thereafter, analog or voice information is passed via the trunk lines and not the SS7 network 12.

Once the caller hangs up, a REL message is generated by CO 14. The REL message includes a cause code that indicates normal clearing. The terminating switch CO 22 then responds with a release complete (RLC) message. By measuring the time between the ANM and the REL message, the billable trunk usage time may be determined. Accordingly, in accordance with one aspect of the present invention, this time period is measured.

The foregoing provides only a brief description of the routing function of the STPs. As is known, the STPs perform other functions as well, but such other functions need not be described herein. Also, the illustration presented above describes the simplest form of signal routing; namely, direct routing. As is known, if a call may not be directly routed due to busy trunk lines, alternative routing strategies are known and understood in the art, but need not be described herein in order to understand the concepts and teachings of the present invention.

Figure 2:
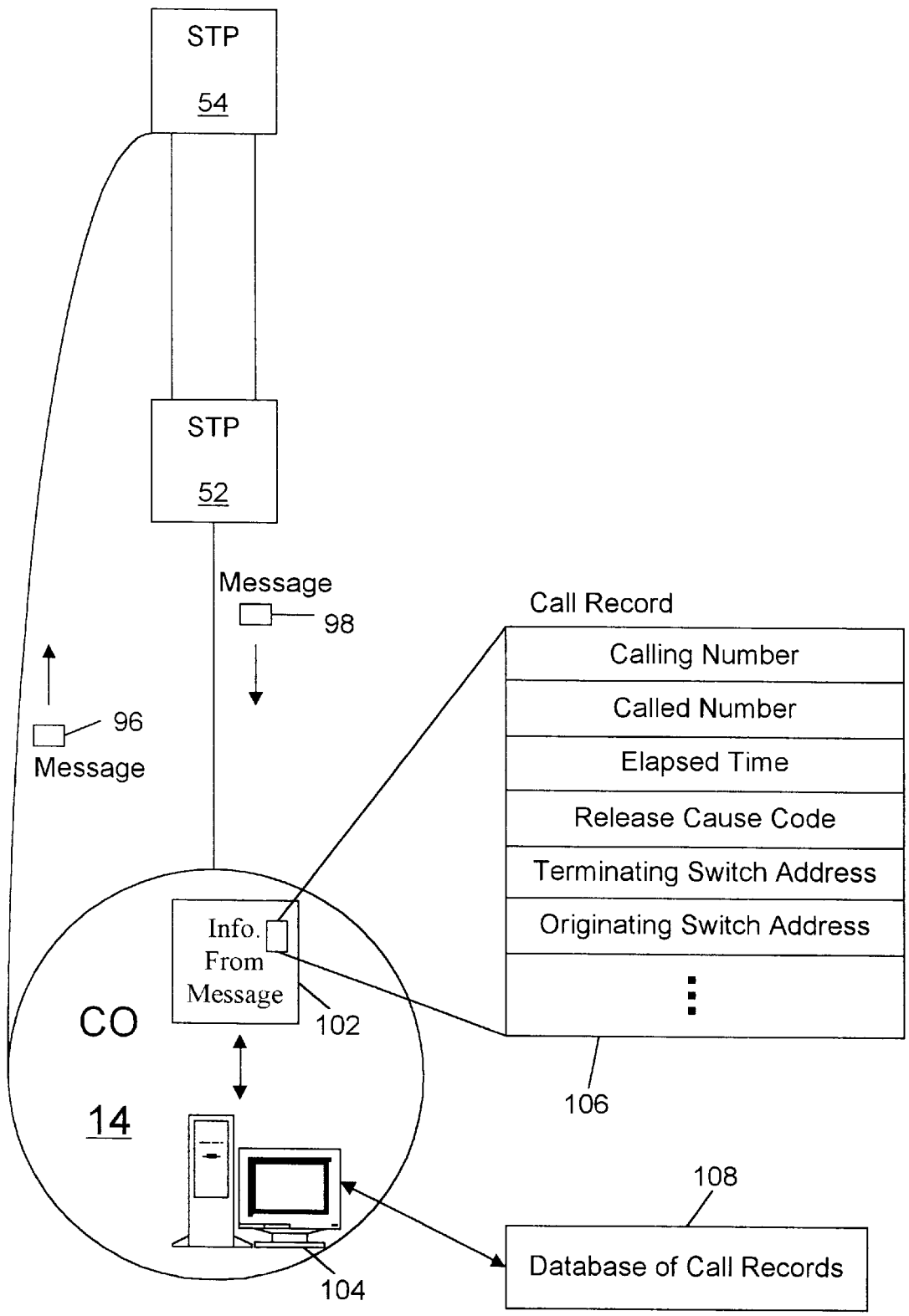
FIG. 2 is block diagram illustrating more detail of a specific portion of the diagram of FIG. 1.

Turning now to FIG. 2, a portion of the network shown in FIG. 1 is illustrated, showing more detail at a CO. Specifically, CO 14, STP 52 and STP 54 are illustrated. Call routing messages 96 and 98 are also illustrated. Specifically call routing message 96 is an outgoing message directed from CO 14 to STP 54, while call routing message 98 is an incoming message directed to the CO 14 from STP 52. Also, graphically illustrated as part of the CO 14 is a block 102 denoted as information from call routing messages. A computer 104 is also illustrated. It will be appreciated from the description that follows that the computer 104 may be a server, a stand alone computer, a dedicated processor, or any other device capable of performing the computing tasks of the present invention.

As is known, the PSTN generates call routing messages that contain certain predefined elements. These elements include the calling number, the called number, terminating switch address, originating switch address, etc. This information is placed in block 102 as a call record 106 using features of the preferred embodiment. The call record 106 includes information already provided by the telephone system, and may include additional information as well. For example, the additional information may include a release cause code, which is a code that specifies the reason that a call is terminated or released. This may include a busy indication at the called number, as well as normal termination of the call by an on-hook condition. The call record 106 also includes the elapsed time of the telephone call, which is the time measured between the ANM signal, which is generated upon answering a placed call, and the REL signal, which is generated upon call termination.

The call record 106 may also be referred to as a temporary call record, as it comprises the record for a single telephone call. Once a call is terminated, the computer 104 processes the temporary call record 106 and adds it to a database of call records 108. This database of call records includes a large number of records corresponding to the various subscribers or customer premises associated with the CO 14. As is known, a single CO 14 will often service some sixty thousand customer premises. Therefore, a correspondingly large number of call records may be maintained in the database 108. Preferably, the call records are indexed in accordance with the called number, which will correspond to a customer premises associated with the CO 14.

Figure 3:
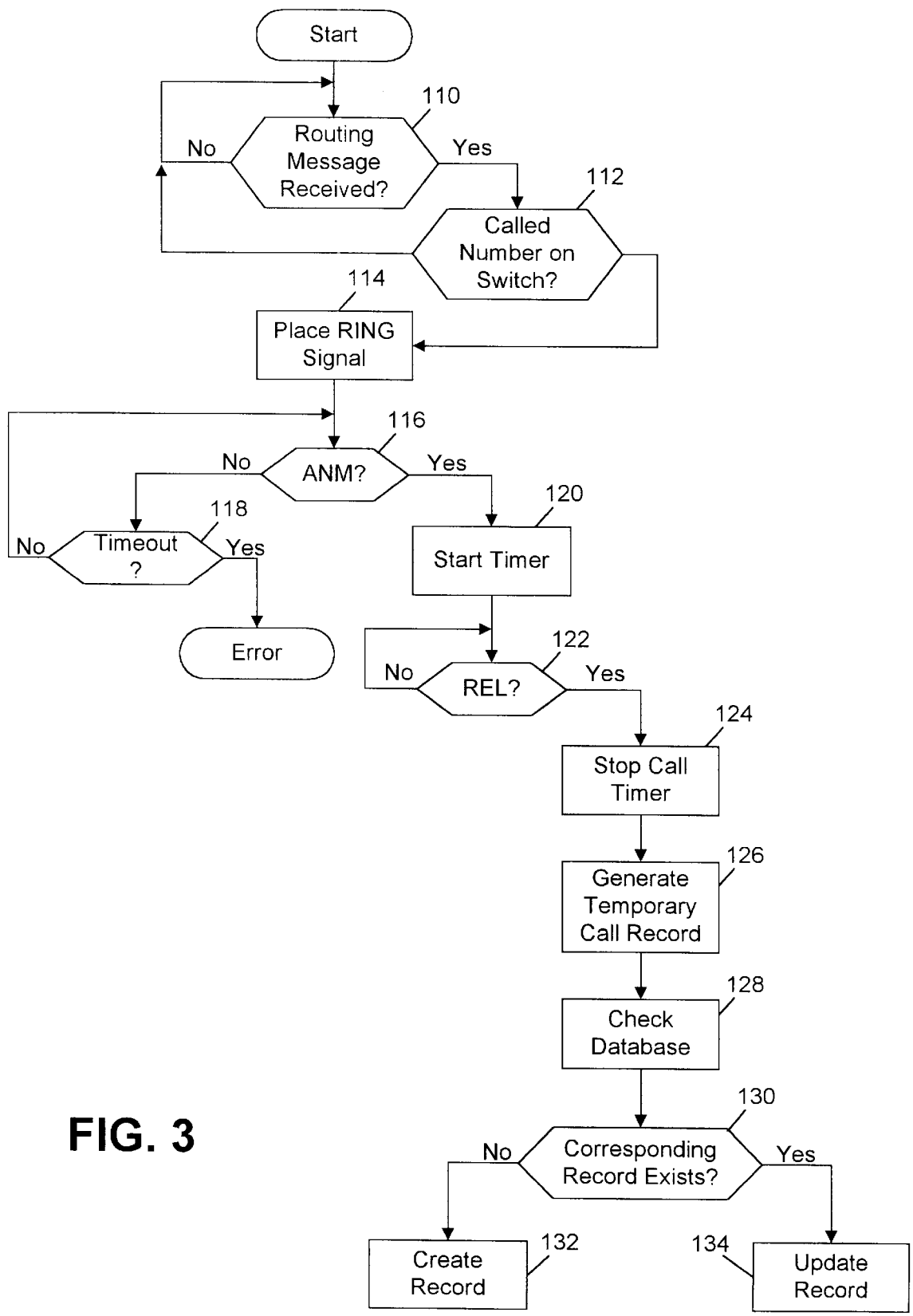
FIG. 3 is a flowchart illustrating the functional operation of the call record generation portion of the present invention.

Having described the structural backbone of the present invention, reference will now be made to FIG. 3, which is a flow chart illustrating the primary steps involved in creating and updating called records in accordance with one embodiment of the present invention. In accordance with the preferred embodiment of the present invention, the inventive aspects are realized through software executing on a computer 104 (see FIG. 2) at a CO. It will be appreciated that the concepts and teachings of the present invention may be implemented through other means or instrumentalities or through software operating at a different location. For example, the computer 104 may be located at STP 54 or STP 56. However, for purposes of discussion and illustration, one embodiment of the present invention implements the inventive aspects through software operating at the CO 14, corresponding to a called number. In this regard, FIG. 3 illustrates a first step 110 as monitoring incoming call routing messages (e.g., call routing message 98) received at the CO 14. Once an incoming routing message is received, the CO evaluates the called number element of the incoming message (at step 112) to determine whether that number corresponds to one of the customer premises associated with that particular CO. If so, the program proceeds to step 114, where the CO places a RING signal on the local loop corresponding to the identified customer premises. The CO then awaits an answer, which is sensed by a change in the impedance across the two conductors of the local loop. If the CO detects an answer, it generates an ANM signal, which is routed back to the call originating CO. The present invention, in one implementation, waits for an ANM signal (at step 116). If no ANM is generated (i.e., the called phone is not answered), then a time-out condition occurs (step 118) and the system may generate or recognize an error condition, which is processed accordingly.

When, however, the answer occurs and the ANM signal is generated by the CO, the telephone system establishes a connection between the calling called party in called party in a manner that is known in the art. This sequence, being well known and understood, need not be described herein. At this time, one implementation of the invention starts a call timer (at step 120) to time the duration of the telephone call. In this regard, the embodiment waits until the call is terminated, which is indicated by a release (REL) signal from the CO at the called end (at step 122). This signal is generated, for example, when the customer or user at the customer premises places the handset back on the telephone. At this point, the preferred embodiment of the invention stops the call timer (step 124) and generates a temporary call record (step 126), as illustrated at block 106 of FIG. 2.

The computer 104 then checks a database 108 of call records (at step 128) to determine whether a call record exists for the corresponding customer—i.e., called number (step 130). If no corresponding record exists, then the computer 104 creates a new record (at step 132) and saves all relevant call record information. If, however, a corresponding record exists, then the computer 104 updates the call record (at step 134) or otherwise generates an additional companion record.

Figure 4:
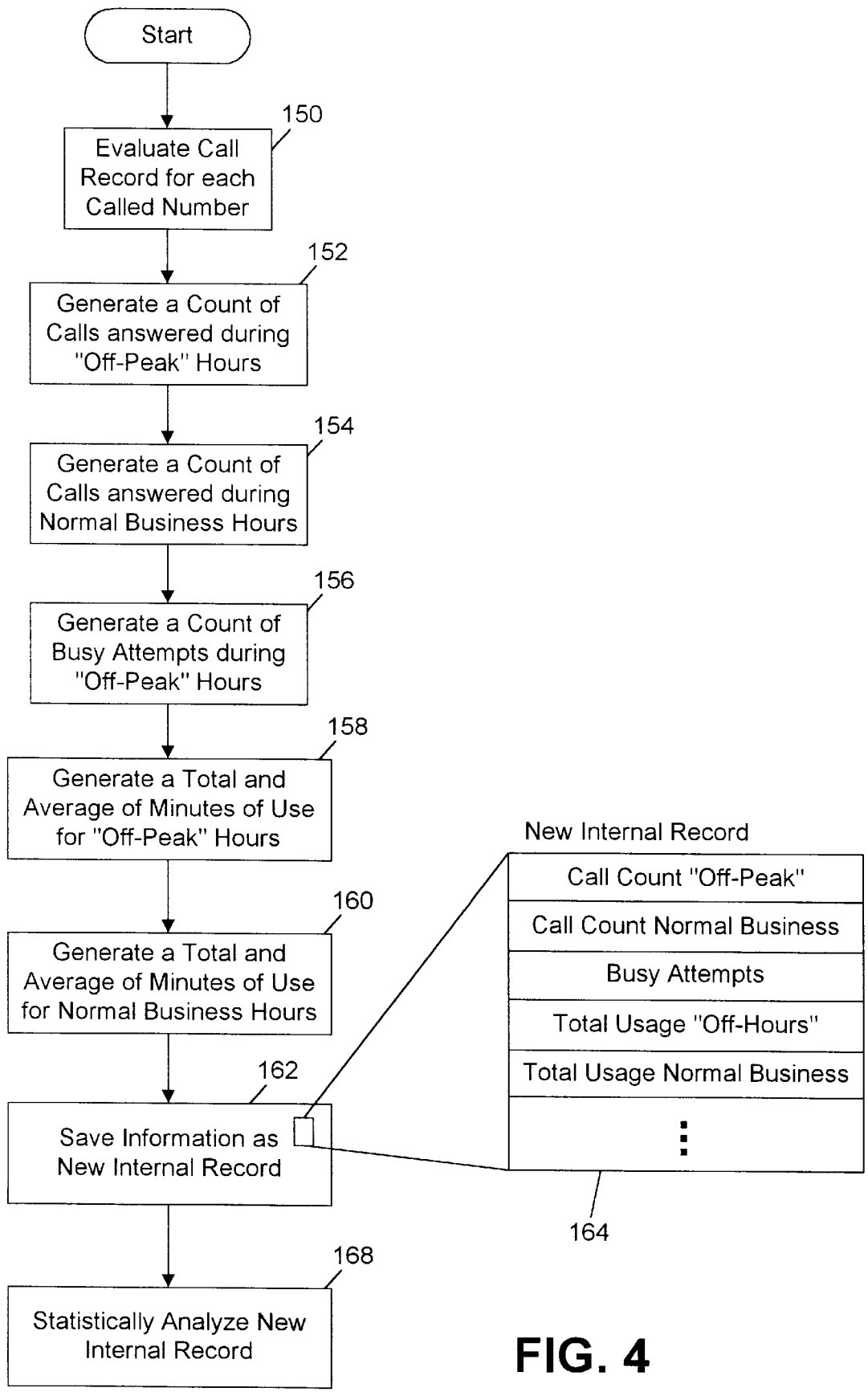
FIG. 4 is a flowchart illustrating the functional operation of a statistical compilation aspect of the present invention.

Having described the generation of call records in accordance with the inventive aspects of the preferred embodiment, reference is now made to FIG. 4, which illustrates another aspect of the present invention. Specifically, FIG. 4 illustrates the manner in which the preferred embodiment analyzes call records to distinguish data service providers from conventional customers. In this regard, the computer 104 evaluates the database of call records 108 to identify all call records associated with a given called number (at step 150). If there is more than one relevant call record, the system may "prune" the plurality of call records into a single, statistical call record. In a manner that will be appreciated, the computer 104 evaluates the various call records and generates a count of calls that were answered by the called number during "offpeak" hours (step 152). What specifically comprises off-peak hours may vary from implementation to implementation, but will generally track normal business hours, such as approximately 8:00 a.m. through approximately 6:00 p.m., Monday through Friday. Thus, calls outside this time period or weekend calls would be considered off-peak calls. The system then generates a count of calls answered by a given called number during on-peak, or during normal business, hours (step 154).

In addition to logging the number of answered calls, the system preferably logs or counts the number of busy call attempts that were made during off-peak hours (step 156). As will be appreciated from the discussion provided herein, an important criteria in identifying data service providers relates to the volume of calls placed during offpeak hours. Therefore, it is not only important to log the number of calls that are successfully attempted, but also to log those calls that fail due to line busy status. Another important identifying criteria is the amount of time logged to a called number. Accordingly, the preferred embodiment computes a total as well as average time of minutes of use logged to a called party during off-peak hours (step 158).

Similarly, the system logs a total and average minutes of use logged to a called party during normal business hours (at step 160). While other information may be generated, the foregoing identifies the primary elements of concern to the preferred embodiment of the present invention. After these elements are generated, the system saves the information as a new internal record (at step 162). Accordingly, the new internal record 164 is defined by a plurality of elements including a count of calls during off-peak hours, a count of calls during normal business hours, busy attempts logged during off-peak hours, a total minutes of use during off-peak hours, an average call length during off-peak hours, a total minutes of use during normal business hours, and an average call duration during normal business hours. It will be appreciated that additional information may be desired and generated, consistent with the concepts and teachings of the present invention.

Finally, at step 168, the invention performs a statistical analysis of the new internal records for each called number in order to distinguish data service providers from conventional telephone system users. A variety of statistical analyses and methods may be used consistent with the concepts and teachings of the present invention, at this step. What is important, for purposes of the preferred embodiment, is that the statistical analysis gives consideration to one or more of the primary elements of the new internal record. Important to this consideration is the average call duration placed during non-peak hours to a given called number. Historically, conventional telephone calls have been, on average, a duration of several minutes. Calls to data service providers, however, are defined by an average call duration of 20 minutes, 30 minutes, or more. Accordingly, in accordance with one embodiment of the present invention, the system may simply evaluate the average call duration to a given called number during off-peak hours, and if that average call duration exceeds a predetermined time, then that called number may be preliminarily defined as a data service provider.

Another important consideration is the ratio of average call duration during off-peak hours verses average call duration during on-peak hours. Similarly, an additional important factor relates to the number of calls placed during off-peak hours and the ratio of calls placed during off-peak hours to the number of calls placed during on-peak hours. In accordance with the preferred embodiment, the system may factor all of these considerations, as well as others, into generating a statistical ranking of those numbers that are most likely data service providers as compared to those which are most likely conventional users. This information may then be used by telephone engineers and the network and system design and layout.

The foregoing description has been presented for purposes of illustration and description. It is not intended to be exhaustive or to limit the invention to the precise forms disclosed. Obvious modifications or variations are possible in light of the above teachings. For example, the computer 104, which controls and carries out the operations of the present invention may be located at a CO, an STP or virtually anywhere along the messaging path. As previously mentioned, the invention is broadly directed to a system that analyzes phone calls (preferably by monitoring call routing messages) to identify data service providers. In one embodiment, the invention may operate by monitoring call billing records at a CO. By analyzing these records, the invention may perform similar processing as described above to identify the numbers of data service providers.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for characterizing phone calls in a public switched telephone network (PSTN), having a plurality of switches interconnected by trunk lines and a plurality of customer premises in communication with the switches, to identify Data Service Providers comprising:

monitoring means disposed at a first location for monitoring routing messages directed to the first location;

generating means responsive to the monitoring means for generating a call record including a plurality of call defining elements, the call record being identified by a first call defining element;

updating means for updating a plurality of call records stored at a storage location with the call defining elements of the generated call record; and analyzing means for analyzing at least one of the call defining elements of the plurality of call records to identify Data Service Providers.

2. The system of claim 1, wherein the monitoring means is configured to detect routing messages defined in accordance with Signaling System Seven protocol.

3. The system of claim 1, wherein the first location is a STP.

4. The system of claim 1, wherein the first location is a central office.

5. The system of claim 1, wherein the call defining elements include at least one element selected from the group consisting of: the calling number, the called number, the release cause code, the terminating switch address, the originating switch address, a count of answered calls the called number received during off-peak hours, a count of answered calls the called number received during on-peak hours, a count of busy call attempts to the called number during off-peak hours, the total minutes of use for the called number during off-peak hours, and the total minutes of use for the called number during on-peak hours.

6. The system of claim 5, wherein the first call defining element is the called number.

7. The system of claim 1, wherein the updating means includes evaluating means for evaluating the first defining element of the call record to be added to the stored plurality of call records to ascertain whether a corresponding call record already exists within the stored plurality of call records.

8. The system of claim 7, wherein the updating means includes integrating means responsive to the evaluating means for integrating the call record into the plurality of call records, wherein the call record is merely added to the plurality of call records if the evaluating means determines that there is no corresponding call record, and the record is merged with a corresponding call record if the evaluating means determines that there is a corresponding call record.

9. The system of claim 1, wherein the analyzing means is configured to compare a value of at least one of the call defining elements with a predetermined value.

10. The system of claim 1, wherein a computer readable storage medium contains executable code for implementing at least one from the group consisting of: the monitoring means, the generating means, the updating means, and the analyzing means.

11. A method for characterizing phone calls in a public switched telephone network (PSTN), having a plurality of switches interconnected by trunk lines and a plurality of customer premises in communication with the switches, to identify Data Service Providers comprising the steps of:

monitoring routing messages directed to a first location;

generating a call record including a plurality of call defining elements, the call record being identified by a first call defining element;

updating a plurality of call records stored at a storage location with the call defining elements of the generated call record; and analyzing at least one of the call defining elements of the plurality of call records to identify Data Service Providers.

12. The method of claim 11, wherein the step of monitoring includes detecting routing messages defined in accordance with Signaling System Seven protocol.

13. The method of claim 11, wherein the step of updating includes evaluating a first defining element of the call record to be added to the stored plurality of call records to ascertain whether a corresponding call record already exists within the stored plurality of call records.

14. The method of claim 13, wherein the step of updating includes integrating the call record into the plurality of call records by adding the call record to the plurality of call records if the evaluating step determines that there is no corresponding call record, and merging the call record into a corresponding call record if the evaluating step determines that there is a corresponding call record.

15. The method of claim 11, wherein the step of analyzing compares a value of at least one of the call defining elements with a predetermined value.

16. A method for characterizing phone calls in a public switched telephone network (PSTN) and detecting data service providers comprising the steps of:

(a) identifying a request to establish a communication link between a calling party and a called party;

(b) if no communication link is established, then
(i) identifying certain signaling data defining a reason that the requested communication link was not established; else
if the communication link is established, then
(ii) identifying the termination of the communication link;

(c) creating a temporary call record for the communication link, the temporary call record including identifying data about the communication link;

(d) if no permanent call record corresponding to the temporary call record exists, then
(i) creating a permanent call record; else
if a permanent call record corresponding to the temporary call record exists, then
(ii) updating the permanent call record;
the permanent call record defining a plurality of statistical data elements; and (e) evaluating the statistical data elements of the permanent call record to identify subscriber numbers of data service providers.

17. The method of claim 16, wherein the identifying data includes at least one element selected from the group consisting of: the calling number, the called number, the release cause code, the terminating switch address, the originating switch address, a count of answered calls the called number received during off-peak hours, a count of answered calls the called number received during on-peak hours, a count of busy call attempts to the called number during off-peak hours, the total minutes of use for the called number during off-peak hours, and the total minutes of use for the called number during on-peak hours a calling number.

18. The method of claim 16, wherein the statistical data elements include at least one element from the group consisting of: a summation of a total number of calls the called party answered during off-peak hours, a summation of a total number of calls the called party answered during peak hours; a summation of a total number of call attempts directed to the called party which were rejected due to a busy status of the called party during off-peak hours; a summation of the total minutes of usage for a called party during off-peak hours; and a summation of the total minutes of usage for a called party during peak hours.

19. The method of claim 16, wherein step (b)(i) further includes the step of measuring the length of time that the communication link was established between the calling party and the called party.

20. The method of claim 16, wherein step (e) further includes the step of comparing the value of one or more of the statistical data elements to a predetermined value.

21. A method for characterizing phone calls in a public switched telephone network (PSTN) and detecting data service providers comprising the steps of:

monitoring messages transmitted through a SS7 network;

generating call records containing cumulative information, as to some elements in a message, at least one element being the elapsed time of a call; and evaluating one or more of the elements to characterize whether a given telephone number is a data service provider.

22. The method of claim 21, wherein the elements in the call record include at least one from the group consisting of: the calling number, the called number, the release cause code, the terminating switch address, the originating switch address, a count of answered calls the called number received during off-peak hours, a count of answered calls the called number received during on-peak hours, a count of busy call attempts to the called number during off-peak hours, the total minutes of use for the called number during off-peak hours, and the total minutes of use for the called number during on-peak hours.

23. The method of claim 21, wherein the step of evaluating includes computing an average call time to a given called phone number, and comparing that average call time against a predetermined value, and if the average call time exceed the predetermined value then concluding that call is being directed to a data service provider.

24. The method of claim 21, wherein the step of evaluating includes computing off-peak hour phone usage against a predetermined value, and if the off-peak hour usage exceeds the predetermined value then concluding that call is being directed to a data service provider.

25. The method of claim 21, wherein the step of evaluating includes computing a rate of failed access attempts due to the called number being busy during off-peak hours and comparing the rate against a predetermined value, wherein if the off-peak hour busy rate exceeds the predetermined value then concluding that call is being directed to a data service provider.

26. The method of claim 21, further including the step of creating a list of identified Data Service Providers.

27. The method of claim 26, wherein the step of evaluating excludes from its execution called numbers that appear in the list of the identified Data Service Providers.

28. The method of claim 21, wherein the method is executed at a central office.

29. A method for characterizing phone calls in a public switched telephone network (PSTN) and identifying data service providers comprising the steps of collecting call records and evaluating the collected call records for one or more calling attributes, and identifying a data service provider by one or more of the calling attributes being compared against a predetermined value.

* * * * *